(12) United States Patent
Onuma et al.

(10) Patent No.: US 7,934,526 B2
(45) Date of Patent: May 3, 2011

(54) AIRCRAFT PNEUMATIC TIRE HAVING CAP TREAD LAYER AND BASE TREAD LAYER

(75) Inventors: Shuichi Onuma, Tokyo (JP); Toru Suzuki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1015 days.

(21) Appl. No.: 10/588,946

(22) PCT Filed: Feb. 8, 2005

(86) PCT No.: PCT/JP2005/001816
§ 371 (c)(1),
(2), (4) Date: May 22, 2007

(87) PCT Pub. No.: WO2005/077680
PCT Pub. Date: Aug. 25, 2005

(65) Prior Publication Data
US 2007/0261773 A1 Nov. 15, 2007

(30) Foreign Application Priority Data
Feb. 13, 2004 (JP) ................................ 2004-036975

(51) Int. Cl.
*B60C 1/00* (2006.01)
*B60C 11/00* (2006.01)
(52) U.S. Cl. .............................. 152/209.5; 152/209.18
(58) Field of Classification Search ............... 152/209.5, 152/209.18
See application file for complete search history.

(56) References Cited

U.S. PATENT DOCUMENTS

| | | | | | |
|---|---|---|---|---|---|
| 3,759,306 | A | * | 9/1973 | Greiner et al. | 152/209.5 |
| 4,527,606 | A | * | 7/1985 | Kita et al. | 152/209.5 |
| 4,735,247 | A | * | 4/1988 | Makino et al. | 152/209.5 |
| 4,913,207 | A | * | 4/1990 | Harakon et al. | 152/209.5 |
| 5,378,754 | A | * | 1/1995 | Bauer et al. | 152/209.5 |
| 5,718,782 | A | * | 2/1998 | Fourgon | 152/209.1 |
| 5,733,393 | A | * | 3/1998 | Hubbell et al. | 152/209.5 |
| 5,843,249 | A | * | 12/1998 | Ryba et al. | 152/209.1 |
| 6,036,800 | A | * | 3/2000 | Corvasce et al. | 152/209.5 |

FOREIGN PATENT DOCUMENTS

EP 370664 * 5/1990

(Continued)

OTHER PUBLICATIONS

Abstract for Japan 04-118305 (no date).*

(Continued)

*Primary Examiner* — Steven D Maki
(74) *Attorney, Agent, or Firm* — Sughrue Mion, PLLC

(57) ABSTRACT

An aircraft pneumatic tire that has deeper grooves without causing deterioration in the heat resistance of a top tread and thereby can increase the number of landings per tread is provided.

At least part of a top tread 2 in the width direction of the tire has a two-layer structure consisting of a base tread layer 11 and a cap tread layer 12 stacked in the radial outward direction in this order. At least one circumferential groove 4a to 4d is provided in the surface of the top tread 2. The base tread layer 11 and the cap tread layer 12 satisfy the relationships expressed by the following formulas (1) and (2):

$$1.05 < M(50)_b/M(50)_c \leqq 1.30 \qquad (1)$$

$$1.04 < R_b/R_c \leqq 1.20 \qquad (2)$$

(wherein $M(50)_b$ and $M(50)_c$ denote 50% moduli of the base tread rubber and the cap tread rubber, respectively, and $R_b$ and $R_c$ denote the resiliences of the base tread rubber and the cap tread rubber, respectively).

5 Claims, 1 Drawing Sheet

FOREIGN PATENT DOCUMENTS

| | | | |
|---|---|---|---|
| EP | 738613 | * | 10/1996 |
| JP | 54-38004 A | | 3/1979 |
| JP | 55-99403 A | | 7/1980 |
| JP | 56-8704 A | | 1/1981 |
| JP | 56-079004 | * | 6/1981 |
| JP | 2-185806 A | | 7/1990 |
| JP | 04-118305 | * | 4/1992 |
| JP | 4-118305 A | | 4/1992 |
| JP | 05-301507 | * | 11/1993 |
| JP | 6-227211 A | | 8/1994 |
| JP | 07-132707 | * | 5/1995 |

OTHER PUBLICATIONS

Machine translation for Japan 05-301507 (no date).*

* cited by examiner

AIRCRAFT PNEUMATIC TIRE HAVING CAP TREAD LAYER AND BASE TREAD LAYER

TECHNICAL FIELD

The present invention relates to an aircraft pneumatic tire (hereinafter also referred to simply as "tire") and more preferably to an aircraft pneumatic tire for use in an aircraft, such as a jetliner.

BACKGROUND ART

In general, aircraft pneumatic tires are classified into two types: a bias-ply tire having a carcass of a bias structure and a radial tire having a carcass of a radial structure. A bias-ply tire includes, on the outside of a carcass having a bias structure, a cushion rubber layer for protecting the carcass ply from being damaged and one or two crown protective layers composed of diagonally disposed organic fibers, from the inside to the outside. In addition, the bias-ply tire also includes a top tread having circumferential straight grooves.

A radial tire includes a plurality of belt plies on the outside of a carcass having a radial structure. To protect the belt plies from being damaged, a radial tire also includes, on the outside of the belt plies, a cushion rubber layer and a crown protective layer of a corrugated cord layer or one or two crown protective layers composed of diagonally disposed organic fibers, from the inside to the outside. A radial tire further includes a top tread having circumferential straight grooves. In general, an aircraft pneumatic tire is replaced with a new one when grooves in a top tread are lost because of wear.

In existing aircraft pneumatic tires, a top tread having a so-called cap and base structure used in pneumatic tires for passenger cars or trucks/buses is not used. This is because the application of a known base rubber compound to an aircraft pneumatic tire results in inappropriate difference in rigidity from both a crown protective layer and a cap rubber, which causes strain concentration during the deformation of a tread under a high load and at a high speed, where an aircraft pneumatic tire is used, thus increasing the possibility of blowout.

In this situation, Patent Document 1, discloses an aircraft tire having a cap/base tread. Patent Document 1 does not take the difference in rigidity into consideration, the aforementioned problem that strain concentration during the deformation of a tread increases the possibility of blowout remains unsolved. Furthermore, Patent Document 1 does not disclose a region occupied by a base rubber.

Apart from the application in an aircraft, for example, Patent Document 2, describes a technique in which, in a pneumatic tire having a tread composed of at least two rubbers, the relationships in the resilience (rebound resilience), the modulus of elasticity, the tread gage, and the like between a cap tread rubber and a base tread rubber are defined to reduce the amount of heat liberated by the tire without decreasing the durability of belt ends and improve the durability of the tire at the same time. Patent Document 3, describes a radial tire for use in passenger cars in which the resilience of each layer of a tread rubber having a two-layer structure is defined. Patent Document 4 describes an automobile tire in which the relationship between the rebound resilience of a base rubber and the loss modulus of a cap rubber is referred to. Patent Document 5 also describes a pneumatic tire in which the relationship between the resilience of a cap rubber layer and the resilience of a base rubber layer is referred to.

Patent Document 1:, Japanese Unexamined Patent Application Publication No. 2-185806
Patent Document 2:, Japanese Unexamined Patent Application Publication No. 54-38004
Patent Document 3:, Japanese Unexamined Patent Application Publication No. 55-99403
Patent Document 4:, Japanese Unexamined Patent Application Publication No. 56-8704
Patent Document 5:Japanese Unexamined Patent Application Publication No. 6-227211

DISCLOSURE OF INVENTION

Problems to be Solved by the Invention

As described above, an aircraft pneumatic tire is usually replaced with a new one when grooves in a top tread are lost because of wear. The worn tire is reused as a recapped tire by replacing a top tread, together with a crown protective layer, such as a reinforced fabric or a cut protector, with a new one. However, there has been a growing demand for reduction in cost of replacing a tire. Thus, a tire capable of increasing the number of landings per tread is desired.

The number of landings per tread can be increased by deepening grooves in a top tread and thereby extending the period until the time when the grooves are lost because of wear. However, simply deepening the groove depth will lower the heat resistance of a top tread and cause the top tread to blow out when an indoor takeoff test is repeated. Thus, an aircraft pneumatic tire capable of increasing the number of landings per tread without causing such a new problem is desired.

Accordingly, it is an object of the present invention to provide a tire that can prevent deterioration in the heat resistance of a top tread even when the groove depth is increased. In particular, the present invention provides an aircraft pneumatic tire capable of increasing the number of landings per tread by utilizing a cap and base structure, which has never been used in an aircraft, while keeping its performance.

Means for Solving the Problems

As a result of extensive research, the present inventor found that the following construction can solve the problems described above and came to achieve the present invention.

An aircraft pneumatic tire according to the present invention includes bead cores provided in a left-and-right pair of beads; a carcass extending from the crown of the tire through both sidewalls of the tire to both beads, wound around the bead cores, and thereby fixed to the beads; a top tread disposed on the outside of the carcass in the radial direction of the tire; and at least one crown protective layer disposed between the carcass and the top tread, wherein at least part of the top tread in the width direction of the tire has a two-layer structure consisting of a base tread layer and a cap tread layer stacked in the radial outward direction in this order, at least one circumferential groove is provided in the surface of the top tread, and the base tread layer and the cap tread layer satisfy the relationships expressed by the following formulas (1) and (2):

$$1.05 < M(50)_b/M(50)_c \leq 1.30 \tag{1}$$

$$1.04 < R_b/R_c \leq 1.20 \tag{2}$$

(wherein $M(50)_b$, and $M(50)_c$, denote 50% moduli of the base tread rubber and the cap tread rubber, respectively, and $R_b$ and $R_c$, denote the resiliences of the base tread rubber and the cap tread rubber, respectively).

Preferably, the base tread layer and the cap tread layer satisfy the relationship expressed by the following formula (3):

$$0.15 \leq G_b/(G_b+G_c) \leq 0.50 \qquad (3)$$

(wherein $G_b$, denotes the thickness of a base tread rubber and $G_c$, denotes the thickness of a cap tread rubber) in a region occupying at least 90% of the crown protective layer width, except a portion directly under the circumferential groove and occupied by the circumferential groove width.

Suitably, the cap tread rubber has a 50% modulus $M(50)_c$ of 1.5, to 1.7, MPa, a 100% modulus $M(100)_c$, of 3.0, to 3.3, MPa, resilience $R_c$, of 50, to 52, and a dynamic storage modulus E' of 0.9, to 1.2, MPa.

A tire according to the present invention is particularly useful when the relationship expressed by the following formula (4) is satisfied:

$$h/H \leq 0.009 \qquad (4)$$

wherein h denotes the depth of center grooves, which are the circumferential grooves nearest to the equator line of the tire, and H denotes the nominal outer diameter of the tire according to the notation by TRA.

Preferably, in the present invention, when the depth of center grooves, which are the circumferential grooves nearest to the equator line of the tire, is at least 10.2, mm, the top tread has a two-layer structure in the vicinity of the center grooves. Preferably, the top tread has the two-layer structure only in the vicinity of the circumferential grooves that are disposed farthest from the equatorial plane of the tire.

ADVANTAGES OF THE INVENTION

In an aircraft pneumatic tire according to the present invention having the construction described above, the heat resistance of a top tread is not lowered even when the groove depth is increased. Thus, when used in an aircraft, a pneumatic tire according to the present invention can increase the number of landings per tread and thus improve cost performance, without causing the existing problems.

Figure 1:
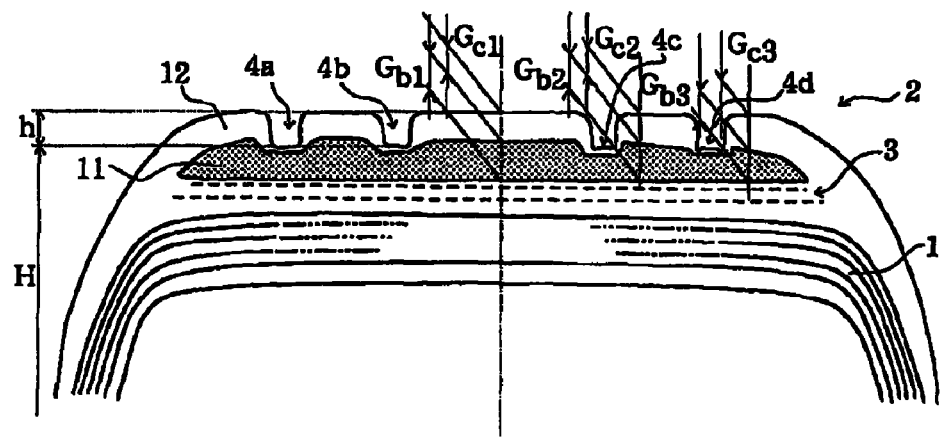
FIG. 1 is a fragmentary sectional view of the vicinity of a crown of an aircraft pneumatic tire according to a preferred embodiment of the present invention.

| Reference Numerals | |
|---|---|
| 1 | carcass |
| 2 | top tread |
| 3 | crown protective layer |
| 4a-4d | circumferential groove |
| 11 | base tread layer |
| 12 | cap tread layer |

BEST MODE FOR CARRYING OUT THE INVENTION

Preferred embodiments of the present invention are described in detail below with reference to the drawings.

FIG. 1 is a fragmentary sectional view of the vicinity of a crown of an aircraft pneumatic tire according to a preferred embodiment of the present invention. As described in FIG. 1, an aircraft pneumatic tire according to the present invention includes bead cores provided in a left-and-right pair of beads (not shown); a carcass 1 extending from the crown of the tire through both sidewalls of the tire to both beads, wound around the bead cores, and thereby fixed to the beads; a top tread 2 disposed on the outside of the carcass 1 in the radial direction of the tire; and at least one crown protective layer 3 disposed between the carcass 1 and the top tread 2. Furthermore, at least one circumferential groove (four circumferential grooves 4a, to 4d, in FIG. 1) is provided in the surface of the top tread 2.

In the present invention, the top tread 2 has a so-called cap and base structure, which is a two-layer structure consisting of a base tread layer 11 and a cap tread layer 12 stacked in the radial outward direction in this order. The base tread layer 11 and the cap tread layer 12 must satisfy the relationships expressed by the following formulas (1) and (2):

$$1.05 < M(50)_b/M(50)_c \leq 1.30 \qquad (1)$$

$$1.04 < R_b/R_c \leq 1.20 \qquad (2)$$

(wherein $M(50)_b$, and $M(50)_c$, denote 50% moduli of the base tread rubber and the cap tread rubber, respectively, and $R_b$ and $R_c$, denote the resiliences of the base tread rubber and the cap tread rubber, respectively). Even when the depth of a groove in the surface of the top tread 2 is increased, a base tread rubber and a cap tread rubber that constitute the base tread layer 11 and the cap tread layer 12, respectively, and have physical property ratios as defined above can reduce the amount of heat generated in the top tread 2. This can prevent the tread from blowing out even when an indoor takeoff test is repeated and can increase the number of landings per tread.

The 50% modulus ratio between the base tread rubber and the cap tread rubber is at least 1.05, and the resilience ratio between them is at least 1.04, in the formulas (1) and (2). When these ratios are less than the defined values, the strain concentrates on the base tread layer 11 and thereby causes the base tread rubber to blow out. Furthermore, the 50% modulus ratio between the base tread rubber and the cap tread rubber is 1.3, or less and the resilience ratio between them is 1.20, or less. When these ratios are more than the defined values, the difference in rigidity between the crown protective layer 3 and the base tread rubber increases. This increases the possibility of blowout at their interface.

Preferably, the thickness $G_b$, of the base tread rubber and the thickness $G_c$, of the cap tread rubber satisfy the following formula (3):

$$0.15 \leq G_b/(G_b+G_c) \leq 0.50 \qquad (3)$$

in a region occupying at least 90% of the width of the crown protective layer 3, except a portion directly under the circumferential grooves 4a, to 4d, and occupied by the circumferential groove widths. When the ratio of the thickness $G_b$, of the base tread rubber to the total thickness $G_b+G_c$, of the top tread is less than 0.15, the effect of decreasing heat generation is small. When this ratio is more than 0.50, the abrasion resistance decreases. The thickness $G_b$, of the base tread rubber refers to the thickness from the interface between the base tread rubber and the cap tread rubber to the interface between the base tread rubber and a coating rubber of the crown protective layer 3. The thickness $G_c$, of the cap tread rubber refers to the thickness from the surface of a new tire to the interface between the base tread rubber and the cap tread rubber. The region occupying at least 90% of the width of the crown protective layer 3 is determined to achieve the effect of a cap and base structure according to the present invention.

Preferably, as specific physical properties, the cap tread rubber has a 50% modulus $M(50)_c$, of 1.5, to 1.7, MPa. a 100% modulus $M(100)_c$, of 3.0, to 3.3, MPa, resilience $R_c$, of 50 to 52, and a dynamic storage modulus E' of 0.9, to 1.2, MPa, from the standpoint of ensuring chevron notch resistance and resistance to chipping, in addition to appropriate abrasion resistance.

In particular, the present invention is effectively applied to an aircraft pneumatic tire having deep grooves that satisfies the relationship expressed by the following formula (4):

$$h/H \leq 0.009 \quad (4)$$

wherein h denotes the depth of center grooves (4b, and 4c, in FIG. 1), which are the circumferential grooves nearest to the equator line of the tire, and H denotes the nominal outer diameter according to the notation by TRA. Under such conditions, the heat resistance is not lowered. By contrast, when grooves of a tire have a shallow depth, the present invention has less advantage.

Figure 2:
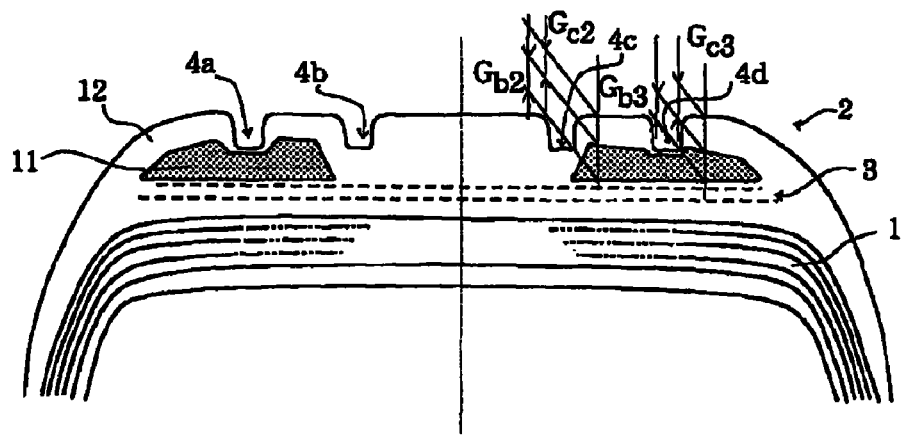
FIG. 2 is a fragmentary sectional view of the vicinity of a crown of an aircraft pneumatic tire according to another preferred embodiment of the present invention.

FIG. 2 is a fragmentary sectional view of the vicinity of a crown of a tire according to another preferred embodiment of the present invention. In the present invention, at least part of the top tread 2 in the width direction of the tire has a two-layer structure must have a two-layer structure consisting of the base tread layer 11 and the cap tread layer 12. As illustrated in FIG. 1, the top tread 2 preferably has the two-layer structure in a region including all circumferential grooves 4a, to 4d. The top tread 2 also preferably has the two-layer structure consisting of the base tread layer 11 and the cap tread layer 12 in the vicinity of the circumferential grooves that are disposed farthest of the circumferential grooves 4a, to 4d, from an equatorial plane of the tire (4a, and 4d, in FIG. 1). This can achieve the effect of decreasing heat generation according to the present invention and increase the number of landings per tread. Most preferably, the top tread 2 according to the present invention has the two-layer structure in the vicinity of circumferential grooves having a depth of at least 10.2, mm, particularly of center grooves 4b, and 4c. This can appropriately prevent deterioration in heat resistance associated with an increase in the groove depth and increase the number of landings per tread.

The present invention can be applied to both the bias-ply tire and the radial tire. For example, when a tire according to the present invention is a bias-ply tire, a cushion rubber layer (not shown) is placed between the carcass 1 and the crown protective layer 3 as appropriate. When a tire according to the present invention is a radial tire, a belt layer and a cushion rubber layer (not shown) are placed between the carcass 1 and the crown protective layer 3 as appropriate. The present invention is not limited in any way, provided that the top tread 2 has the two-layer structure consisting of the base tread layer 11 and the cap tread layer 12. Other factors, such as a tire structure and the quality of material, can properly be selected by an ordinary method.

EXAMPLES

The present invention is specifically described below with reference to examples.

Comparative Examples 1, and 2

Figure 3:
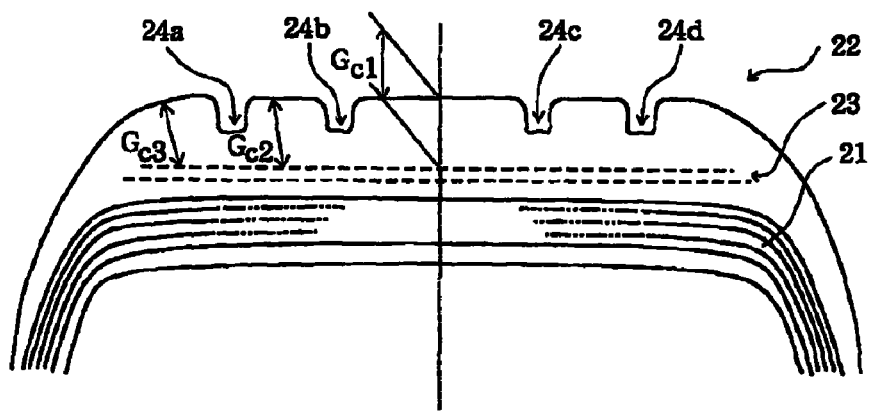
FIG. 3 is a fragmentary sectional view of the vicinity of a crown of an aircraft pneumatic tire according to a comparative example.

A tire prepared according to Comparative Example 1, had a structure illustrated in FIG. 3 and a size of H44.5×16.5-21 28PR, and included center grooves 24b, and 24c, having a depth of 10.2, mm. A tire prepared according to Comparative Example 2, had the same structure as that of Comparative Example 1, except that the depth of center grooves 24b, and 24c, was changed from 10.2, mm to 12.7, mm. Comparative Examples 1, and 2, were repeatedly subjected to an indoor takeoff test. In FIG. 3, reference numeral 21 denotes a carcass, reference numeral 22 denotes a top tread, and reference numeral 23 denotes a crown protective layer (reinforced fabric). As a result, the tire according to Comparative Example 2, having deeper grooves blew out at the top tread at 120, times of the takeoff tests.

Examples 1, and 2

Tires prepared according to Examples 1, and 2, had the same size as that in Comparative Examples 1, and 2, and center grooves having a depth of 12.7, mm, and had structures illustrated in FIGS. 1 and 3, respectively. The tires according to these Examples were repeatedly subjected to the indoor takeoff test as in Comparative Examples 1, and 2. The tires according to these Examples did not blow out at the tread at at least 200, times of the takeoff tests.

Table 1, illustrates the results for Comparative Examples and Examples, together with physical properties: the depths of center grooves 4b, and 4c, (24b, and 24c) and second grooves 4a, and 4d, (24a, and 24d); the thicknesses of a base tread rubber (gage) $G_{b1}$, to $G_{b3}$, and the thicknesses of a cap tread rubber (gage) $G_{c1}$, to $G_{c3}$; 50% modulus, 100% modulus, the resilience, and the dynamic storage modulus E' of the cap tread rubber; and 50% modulus and the resilience of the base tread rubber, and the number of drawing illustrating the tire structure. Methods for determining the physical properties are described below.

(Determination of Modulus)

50% moduli of the cap tread rubber and the base tread rubber were determined by measuring tensile stress at 50% elongation according to JIS K 6251-1993, using a No. 3 dumbbell specimen at a temperature of 24±2, degree C. 100% modulus was also determined for the cap tread rubber under the same conditions.

(Determination of Resilience)

The resiliences of the cap tread rubber and the base tread rubber were determined by a rebound resilience test method according to JIS K 6255-1996, at a temperature of 24±2, degree C.

(Determination of Dynamic Storage Modulus (E'))

The dynamic storage modulus of the cap tread rubber was determined using a specimen (thickness 2, mm, width 4.7, mm, length 20, mm) under an initial static load of 160, g and at an average strain amplitude of 2%, a frequency of 52, Hz, and a temperature of 24±2, degree C. with a spectrometer from Toyo Seiki Seisaku-Sho, Ltd.

TABLE 1

| | | | Comparative Example 1 | Comparative Example 2 | Example 1 | Example 2 |
|---|---|---|---|---|---|---|
| Tire size | | | | H44.5 × 16.5-21 | | |
| PR | | | | 28 | | |
| Groove depth | Center groove | (mm) | 10.2 | | 12.7 | |
| | Second groove | (mm) | 9.4 | | 11.1 | |
| Cap tread rubber gage | $G_{C1}$ | (mm) | 12.0 | 13.5 | 7.2 | 13.5 |
| | $G_{C2}$ | (mm) | 11.8 | 13.3 | 7.1 | 7.0 |
| | $G_{C3}$ | (mm) | 11.5 | 13.2 | 7.0 | 6.8 |
| Base tread rubber gage | $G_{b1}$ | (mm) | | — | 6.3 | — |
| | $G_{b2}$ | (mm) | | — | 6.2 | 6.3 |
| | $G_{b3}$ | (mm) | | — | 6.2 | 6.4 |
| Cap tread rubber | 50% modulus | (MPa) | | 1.6 | | |
| | 100% modulus | (MPa) | | 3.2 | | |
| | Resilience | (—) | | 50 | | |
| | E' | (MPa) | | 1.0 | | |
| Base tread rubber | 50% modulus | (MPa) | | — | 1.8 | |
| | Resilience | (—) | | — | 56 | |
| Schematic cross-sectional view | | | FIG. 3 | FIG. 3 | FIG. 1 | FIG. 2 |
| Number of takeoff tests | | | at least 200 | 120 | at least 200 | at least 200 |

As shown in Table 1, in the aircraft pneumatic tire according to Examples 1, and 2, of the present invention, deeper grooves did not exacerbate heat build-up, repeated indoor takeoff tests did not cause the tread to blow out, and thereby the number of landings per tread could be increased when used in an aircraft.

The invention claimed is:

1. An aircraft pneumatic tire comprising:
   bead cores provided in a left-and-right pair of beads;
   a carcass extending from the crown of the tire through both sidewalls of the tire to both beads, wound around the bead cores, and thereby fixed to the beads;
   a top tread disposed on the outside of the carcass in the radial direction of the tire; and
   at least one crown protective layer disposed between the carcass and the top tread,
   wherein at least part of the top tread in the width direction of the tire has a two-layer structure consisting of a base tread layer and a cap tread layer stacked in the radial outward direction in this order, at least one circumferential groove is provided in the surface of the top tread, and the base tread layer and the cap tread layer satisfy the relationships expressed by the following formulas (1) and (2):

$$1.05 < M(50)_b/M(50)_c \leq 1.30 \qquad (1)$$

$$1.04 < R_b/R_c \leq 1.20 \qquad (2)$$

(wherein $M(50)_b$ and $M(50)_c$ denote 50% moduli of a base tread rubber and a cap tread rubber, respectively, and $R_b$ and $R_c$ denote the resiliences of the base tread rubber and the cap tread rubber, respectively); and
   wherein the cap tread rubber has a 50% modulus $M(50)_c$ of 1.5 to 1.7 MPa, a 100% modulus M(100), of 3.0 to 3.3 MPa, resilience $R_c$ of 50 to 52, and a dynamic storage modulus E' of 0.9 to 1.2 MPa.

2. The aircraft pneumatic tire according to claim 1, wherein the base tread layer and the cap tread layer satisfy the relationship expressed by the following formula (3):

$$0.15 \leq G_b/(G_b + G_c) \leq 0.50 \qquad (3)$$

(wherein $G_b$ denotes the thickness of a base tread rubber and $G_c$ denotes the thickness of a cap tread rubber) in a region occupying at least 90% of the crown protective layer width, except a portion directly under the circumferential groove and occupied by the circumferential groove width.

3. The aircraft pneumatic tire according to claim 1, wherein the relationship expressed by the following formula (4) is satisfied:

$$h/H \leq 0.009 \qquad (4)$$

wherein h denotes the depth of the at least one circumferential groove nearest to the equator line of the tire, and H denotes the nominal outer diameter of the tire according to the notation by TRA.

4. The aircraft pneumatic tire according to claim 1, wherein the depth of the at least one circumferential groove nearest to the equator line of the tire, is at least 10.2 mm and the top tread has a two-layer structure in the vicinity of the at least one circumferential groove.

5. The aircraft pneumatic tire according to claim 1, wherein the top tread has the two-layer structure only in the vicinity of circumferential grooves that are disposed farthest from the equatorial plane of the tire.

* * * * *